US008657935B2

(12) United States Patent
Lardy et al.

(10) Patent No.: US 8,657,935 B2
(45) Date of Patent: Feb. 25, 2014

(54) COMBINATION OF EXPANSION AND COOLING TO ENHANCE SEPARATION

(75) Inventors: Pascal Lardy, Houston, TX (US); H. Allan Kidd, Singlehouse, PA (US); William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 13/704,797

(22) PCT Filed: May 19, 2011

(86) PCT No.: PCT/US2011/037112
§ 371 (c)(1),
(2), (4) Date: Jul. 31, 2013

(87) PCT Pub. No.: WO2012/012018
PCT Pub. Date: Jan. 26, 2012

(65) Prior Publication Data
US 2013/0298764 A1    Nov. 14, 2013

Related U.S. Application Data

(60) Provisional application No. 61/366,026, filed on Jul. 20, 2010.

(51) Int. Cl.
*B01D 45/12* (2006.01)
(52) U.S. Cl.
USPC ............... 95/271; 55/315; 55/317; 55/318; 55/319; 55/400; 55/401; 55/467; 55/406; 415/121.2
(58) Field of Classification Search
USPC ........... 55/315, 317–319, 400–401, 467, 406; 95/271; 62/646; 415/121.2
See application file for complete search history.

(56) References Cited

U.S. PATENT DOCUMENTS

| | | | |
|---|---|---|---|
| 815,812 | A | 3/1906 | Gow |
| 1,057,613 | A | 4/1913 | Baldwin |
| 1,061,656 | A | 5/1913 | Black |
| 1,480,775 | A | 1/1924 | Marien |
| 1,622,768 | A | 3/1927 | Cook |
| 1,642,454 | A | 9/1927 | Malmstrom |

(Continued)

FOREIGN PATENT DOCUMENTS

| | | |
|---|---|---|
| AU | 2005282269 | 9/2005 |
| CA | 2578262 | 9/2005 |

(Continued)

OTHER PUBLICATIONS

Bi-Phase Rotary Separator Turbine, Multiphase Power & Processing Technologies LLC Technical literature (available at http://www.mpptech.com/techppp/pdfs/Bi-Phase.pdf).

(Continued)

*Primary Examiner* — Dung H Bui
(74) *Attorney, Agent, or Firm* — Edmonds & Nolte, PC (57) ABSTRACT

A method and system for expanding, separating, and compressing a multi-phase fluid. An expander receives and expands the multi-phase fluid to generate a lower-pressure fluid which can more efficiently be separated in a separator. Expanding the fluid also drives a main shaft adapted to drive at least the separator and a compressor coupled thereto. The separator receives the lower-pressure fluid, separates any higher-density components from the lower-density components disposed therein, and provides a substantially dry gas to the compressor to be re-compressed and discharged from the system.

20 Claims, 2 Drawing Sheets

(56) References Cited

U.S. PATENT DOCUMENTS

| | | |
|---|---|---|
| 2,006,244 A | 6/1935 | Kopsa |
| 2,300,766 A | 11/1942 | Baumann |
| 2,328,031 A | 8/1943 | Risley |
| 2,345,437 A | 3/1944 | Tinker |
| 2,347,939 A | 5/1944 | Down |
| 2,383,244 A | 8/1945 | Farmer |
| 2,720,313 A | 12/1951 | Pattison |
| 2,602,462 A | 7/1952 | Barrett |
| 2,743,865 A | 5/1956 | Graae |
| 2,811,303 A | 10/1957 | Ault |
| 2,836,117 A | 5/1958 | Lankford |
| 2,868,565 A | 1/1959 | Suderow |
| 2,897,917 A | 8/1959 | Hunter |
| 2,932,360 A | 4/1960 | Hungate |
| 2,954,841 A | 10/1960 | Reistle |
| 2,955,673 A | 10/1960 | Kennedy |
| 3,044,657 A | 7/1962 | Horton |
| 3,175,572 A | 3/1965 | Kauer, Jr. |
| 3,191,364 A | 6/1965 | Sylvan |
| 3,198,214 A | 8/1965 | Lorenz |
| 3,204,696 A | 9/1965 | De Priester |
| 3,213,794 A | 10/1965 | Adams |
| 3,220,245 A | 11/1965 | Van Winkle |
| 3,273,325 A | 9/1966 | Gerhold |
| 3,341,111 A | 9/1967 | Sanders |
| 3,352,577 A | 11/1967 | Medney |
| 3,395,511 A | 8/1968 | Åkerman |
| 3,420,434 A | 1/1969 | Swearingen |
| 3,431,747 A | 3/1969 | Hasheimi et al. |
| 3,454,163 A | 7/1969 | Read |
| 3,487,432 A | 12/1969 | Jenson |
| 3,490,209 A | 1/1970 | Fernandes |
| 3,500,614 A | 3/1970 | Soo |
| 3,548,568 A | 12/1970 | Carlson, Jr. |
| 3,578,342 A | 5/1971 | Satterthwaite et al. |
| 3,628,812 A | 12/1971 | Larralde |
| 3,646,727 A | 3/1972 | Wachsmuth |
| 3,672,733 A | 6/1972 | Arsenius et al. |
| 3,694,103 A | 9/1972 | Cohen |
| 3,810,347 A | 5/1974 | Kartinen |
| 3,814,486 A | 6/1974 | Schurger |
| 3,829,179 A | 8/1974 | Kurita |
| 3,915,673 A | 10/1975 | Tamai |
| 3,973,930 A | 8/1976 | Burgess |
| 3,975,123 A | 8/1976 | Schibbye |
| 4,033,647 A | 7/1977 | Beavers |
| 4,043,353 A | 8/1977 | Shirey |
| 4,059,364 A | 11/1977 | Anderson |
| 4,078,809 A | 3/1978 | Garrick |
| 4,087,261 A | 5/1978 | Hays |
| 4,103,899 A | 8/1978 | Turner |
| 4,112,687 A | 9/1978 | Dixon |
| 4,117,359 A | 9/1978 | Wehde |
| 4,135,542 A | 1/1979 | Chisholm |
| 4,141,283 A | 2/1979 | Swanson |
| 4,146,261 A | 3/1979 | Edmaier |
| 4,165,622 A | 8/1979 | Brown, Jr. |
| 4,174,925 A | 11/1979 | Pfenning |
| 4,182,480 A | 1/1980 | Theyse |
| 4,197,990 A | 4/1980 | Carberg |
| 4,205,927 A | 6/1980 | Simmons |
| 4,227,373 A | 10/1980 | Amend |
| 4,258,551 A | 3/1981 | Ritzi |
| 4,259,045 A | 3/1981 | Teruyama |
| 4,278,200 A | 7/1981 | Gunnewig |
| 4,298,311 A | 11/1981 | Ritzi |
| 4,303,372 A | 12/1981 | Caffrey |
| 4,333,748 A | 6/1982 | Erickson |
| 4,334,592 A | 6/1982 | Fair |
| 4,336,693 A | 6/1982 | Hays |
| 4,339,923 A | 7/1982 | Hays |
| 4,347,900 A | 9/1982 | Barrington |
| 4,363,608 A | 12/1982 | Mulders |
| 4,374,583 A | 2/1983 | Barrington |
| 4,375,975 A | 3/1983 | McNicholas |
| 4,382,804 A | 5/1983 | Mellor |
| 4,384,724 A | 5/1983 | Derman |
| 4,391,102 A | 7/1983 | Studhalter |
| 4,396,361 A | 8/1983 | Fraser |
| 4,432,470 A | 2/1984 | Sopha |
| 4,438,638 A | 3/1984 | Hays |
| 4,441,322 A | 4/1984 | Ritzi |
| 4,442,925 A | 4/1984 | Fukushima |
| 4,453,893 A | 6/1984 | Hutmaker |
| 4,453,894 A | 6/1984 | Ferone |
| 4,463,567 A | 8/1984 | Amend |
| 4,468,234 A | 8/1984 | McNicholas |
| 4,471,795 A | 9/1984 | Linhardt |
| 4,477,223 A | 10/1984 | Giroux |
| 4,502,839 A | 3/1985 | Maddox |
| 4,511,309 A | 4/1985 | Maddox |
| 4,531,888 A | 7/1985 | Buchelt |
| 4,536,134 A | 8/1985 | Huiber |
| 4,541,531 A | 9/1985 | Brule |
| 4,541,607 A | 9/1985 | Hotger |
| 4,573,527 A | 3/1986 | McDonough |
| 4,574,815 A | 3/1986 | West |
| 4,648,806 A | 3/1987 | Alexander |
| 4,650,578 A | 3/1987 | Cerdan |
| 4,687,017 A | 8/1987 | Danko |
| 4,721,561 A | 1/1988 | Oetiker |
| 4,737,081 A | 4/1988 | Nakajima |
| 4,752,185 A | 6/1988 | Butler |
| 4,807,664 A | 2/1989 | Wilson |
| 4,813,495 A | 3/1989 | Leach |
| 4,821,737 A | 4/1989 | Nelson |
| 4,826,403 A | 5/1989 | Catlow |
| 4,830,331 A | 5/1989 | Vindum |
| 4,832,709 A | 5/1989 | Nagyszalanczy |
| 4,904,284 A | 2/1990 | Hanabusa |
| 4,984,830 A | 1/1991 | Saunders |
| 5,007,328 A | 4/1991 | Otterman |
| 5,024,585 A | 6/1991 | Kralovec |
| 5,043,617 A | 8/1991 | Rostron |
| 5,044,701 A | 9/1991 | Wantanabe |
| 5,045,046 A | 9/1991 | Bond |
| 5,054,995 A | 10/1991 | Kaseley |
| 5,064,452 A | 11/1991 | Yano |
| 5,080,137 A | 1/1992 | Adams |
| 5,163,895 A | 11/1992 | Titus |
| 5,190,440 A | 3/1993 | Maier |
| 5,202,024 A | 4/1993 | Andersson |
| 5,202,026 A | 4/1993 | Lema |
| 5,203,891 A | 4/1993 | Lema |
| 5,207,810 A | 5/1993 | Sheth |
| 5,211,427 A | 5/1993 | Washizu |
| 5,244,479 A | 9/1993 | Dean, II |
| 5,246,346 A | 9/1993 | Schiesser |
| 5,280,766 A | 1/1994 | Mohn |
| 5,285,123 A | 2/1994 | Kataoka |
| 5,306,051 A | 4/1994 | Loker |
| 5,337,779 A | 8/1994 | Fukuhara |
| 5,378,121 A | 1/1995 | Hackett |
| 5,382,141 A | 1/1995 | Stinessen |
| 5,385,446 A | 1/1995 | Hays |
| 5,412,977 A | 5/1995 | Schmohl |
| 5,421,708 A | 6/1995 | Utter |
| 5,443,581 A | 8/1995 | Malone |
| 5,464,536 A | 11/1995 | Rogers |
| 5,484,521 A | 1/1996 | Kramer |
| 5,496,394 A | 3/1996 | Nied |
| 5,500,039 A | 3/1996 | Mori |
| 5,525,034 A | 6/1996 | Hays |
| 5,525,146 A | 6/1996 | Straub |
| 5,531,811 A | 7/1996 | Kloberdanz |
| 5,538,259 A | 7/1996 | Uhmer |
| 5,542,831 A | 8/1996 | Scarfone |
| 5,575,309 A | 11/1996 | Connell |
| 5,575,615 A | 11/1996 | Mohn |
| 5,585,000 A | 12/1996 | Sassi |
| 5,605,172 A | 2/1997 | Schubert |
| 5,622,621 A | 4/1997 | Kramer |
| 5,628,623 A | 5/1997 | Skaggs |
| 5,634,492 A | 6/1997 | Steinruck |

(56) References Cited

U.S. PATENT DOCUMENTS

| | | | |
|---|---|---|---|
| 5,640,472 | A | 6/1997 | Meinzer |
| 5,641,280 | A | 6/1997 | Timuska |
| 5,653,347 | A | 8/1997 | Larsson |
| 5,664,420 | A | 9/1997 | Hays |
| 5,682,759 | A | 11/1997 | Hays |
| 5,683,235 | A | 11/1997 | Satterthwaite |
| 5,685,691 | A | 11/1997 | Hays |
| 5,687,249 | A | 11/1997 | Kato |
| 5,693,125 | A | 12/1997 | Dean |
| 5,703,424 | A | 12/1997 | Dorman |
| 5,709,528 | A | 1/1998 | Hablanian |
| 5,713,720 | A | 2/1998 | Barhoum |
| 5,720,799 | A | 2/1998 | Hays |
| 5,749,391 | A | 5/1998 | Loutzenhiser |
| 5,750,040 | A | 5/1998 | Hays |
| 5,775,882 | A | 7/1998 | Kiyokawa |
| 5,779,619 | A | 7/1998 | Borgstrom |
| 5,795,135 | A | 8/1998 | Nyilas |
| 5,800,092 | A | 9/1998 | Nill |
| 5,848,616 | A | 12/1998 | Vogel |
| 5,850,857 | A | 12/1998 | Simpson |
| 5,853,585 | A | 12/1998 | Nesseth |
| 5,861,052 | A | 1/1999 | Meinander |
| 5,863,023 | A | 1/1999 | Evans |
| 5,899,435 | A | 5/1999 | Mitsch |
| 5,935,053 | A | 8/1999 | Strid |
| 5,938,803 | A | 8/1999 | Dries |
| 5,938,819 | A | 8/1999 | Seery |
| 5,946,915 | A | 9/1999 | Hays |
| 5,951,066 | A | 9/1999 | Lane |
| 5,965,022 | A | 10/1999 | Gould |
| 5,967,746 | A | 10/1999 | Hagi |
| 5,971,702 | A | 10/1999 | Afton |
| 5,971,907 | A | 10/1999 | Johannemann |
| 5,980,218 | A | 11/1999 | Takahashi |
| 5,988,524 | A | 11/1999 | Odajima |
| 6,027,311 | A | 2/2000 | Hill |
| 6,035,934 | A | 3/2000 | Stevenson |
| 6,059,539 | A | 5/2000 | Nyilas |
| 6,068,447 | A | 5/2000 | Foege |
| 6,090,174 | A | 7/2000 | Douma |
| 6,090,299 | A | 7/2000 | Hays |
| 6,113,675 | A | 9/2000 | Branstetter |
| 6,122,915 | A | 9/2000 | Hays |
| 6,123,363 | A | 9/2000 | Burgard |
| 6,145,844 | A | 11/2000 | Waggott |
| 6,149,825 | A | 11/2000 | Gargas |
| 6,151,881 | A | 11/2000 | Ai |
| 6,187,208 | B1 | 2/2001 | White |
| 6,196,962 | B1 | 3/2001 | Purvey |
| 6,206,202 | B1 | 3/2001 | Galk |
| 6,214,075 | B1 | 4/2001 | Filges |
| 6,217,637 | B1 | 4/2001 | Toney |
| 6,227,379 | B1 | 5/2001 | Nesseth |
| 6,277,278 | B1 | 8/2001 | Conrad |
| 6,312,021 | B1 | 11/2001 | Thomas |
| 6,314,738 | B1 | 11/2001 | Hays |
| 6,372,006 | B1 | 4/2002 | Pregenzer |
| 6,375,437 | B1 | 4/2002 | Nolan |
| 6,383,262 | B1 | 5/2002 | Marthinsen |
| 6,394,764 | B1 | 5/2002 | Samurin |
| 6,398,973 | B1 | 6/2002 | Saunders |
| 6,402,465 | B1 | 6/2002 | Maier |
| 6,426,010 | B1 | 7/2002 | Lecoffre |
| 6,464,469 | B1 | 10/2002 | Grob |
| 6,467,988 | B1 | 10/2002 | Czachor |
| 6,468,426 | B1 | 10/2002 | Klass |
| 6,485,536 | B1 | 11/2002 | Masters |
| 6,530,484 | B1 | 3/2003 | Bosman |
| 6,530,979 | B2 | 3/2003 | Firey |
| 6,531,066 | B1 | 3/2003 | Saunders |
| 6,537,035 | B2 | 3/2003 | Shumway |
| 6,540,917 | B1 | 4/2003 | Rachels et al. |
| 6,547,037 | B2 | 4/2003 | Kuzdzal |
| 6,592,654 | B2 | 7/2003 | Brown |
| 6,596,046 | B2 | 7/2003 | Conrad |
| 6,599,086 | B2 | 7/2003 | Soja |
| 6,607,348 | B2 | 8/2003 | Jean |
| 6,616,719 | B1 | 9/2003 | Sun |
| 6,617,731 | B1 | 9/2003 | Goodnick |
| 6,629,825 | B2 | 10/2003 | Stickland |
| 6,631,617 | B1 | 10/2003 | Dreiman |
| 6,658,986 | B2 | 12/2003 | Pitla |
| 6,659,143 | B1 | 12/2003 | Taylor |
| 6,669,845 | B2 | 12/2003 | Klass |
| 6,688,802 | B2 | 2/2004 | Ross |
| 6,707,200 | B2 | 3/2004 | Carroll |
| 6,718,955 | B1 | 4/2004 | Knight |
| 6,719,830 | B2 | 4/2004 | Illingworth |
| 6,764,284 | B2 | 7/2004 | Oehman |
| 6,776,812 | B2 | 8/2004 | Komura |
| 6,802,693 | B2 | 10/2004 | Reinfeld |
| 6,802,881 | B2 | 10/2004 | Illingworth |
| 6,811,713 | B2 | 11/2004 | Arnaud |
| 6,817,846 | B2 | 11/2004 | Bennitt |
| 6,827,974 | B2 | 12/2004 | Nelson |
| 6,837,913 | B2 | 1/2005 | Schilling |
| 6,843,836 | B2 | 1/2005 | Kitchener |
| 6,878,187 | B1 | 4/2005 | Hays |
| 6,893,208 | B2 | 5/2005 | Frosini |
| 6,907,933 | B2 | 6/2005 | Choi |
| 6,979,358 | B2 | 12/2005 | Ekker |
| 7,000,893 | B2 | 2/2006 | Yakushi |
| 7,001,448 | B1 | 2/2006 | West |
| 7,013,978 | B2 | 3/2006 | Appleford |
| 7,022,150 | B2 | 4/2006 | Borgstrom |
| 7,022,153 | B2 | 4/2006 | McKenzie |
| 7,025,890 | B2 | 4/2006 | Moya |
| 7,033,410 | B2 | 4/2006 | Hilpert |
| 7,033,411 | B2 | 4/2006 | Carlsson |
| 7,056,363 | B2 | 6/2006 | Carlsson |
| 7,063,465 | B1 | 6/2006 | Wilkes |
| 7,112,036 | B2 | 9/2006 | Lubell |
| 7,131,292 | B2 | 11/2006 | Ikegami |
| 7,144,226 | B2 | 12/2006 | Pugnet |
| 7,159,723 | B2 | 1/2007 | Hilpert |
| 7,160,518 | B2 | 1/2007 | Chen |
| 7,169,305 | B2 | 1/2007 | Gomez |
| 7,185,447 | B2 | 3/2007 | Arbeiter |
| 7,204,241 | B2 | 4/2007 | Thompson |
| 7,241,392 | B2 | 7/2007 | Maier |
| 7,244,111 | B2 | 7/2007 | Suter |
| 7,258,713 | B2 | 8/2007 | Eubank |
| 7,270,145 | B2 | 9/2007 | Koezler |
| 7,288,139 | B1 | 10/2007 | Showalter |
| 7,288,202 | B2 | 10/2007 | Maier |
| 7,314,560 | B2 | 1/2008 | Yoshida |
| 7,323,023 | B2 | 1/2008 | Yolker |
| 7,328,749 | B2 | 2/2008 | Reitz |
| 7,335,313 | B2 | 2/2008 | Moya |
| 7,377,110 | B2 | 5/2008 | Sheridan et al. |
| 7,381,235 | B2 | 6/2008 | Koene |
| 7,396,373 | B2 | 7/2008 | Lagerstedt |
| 7,399,412 | B2 | 7/2008 | Keuschnigg |
| 7,435,290 | B2 | 10/2008 | Lane |
| 7,445,653 | B2 | 11/2008 | Trautmann |
| 7,470,299 | B2 | 12/2008 | Han |
| 7,473,083 | B2 | 1/2009 | Oh |
| 7,479,171 | B2 | 1/2009 | Cho |
| 7,494,523 | B2 | 2/2009 | Oh |
| 7,501,002 | B2 | 3/2009 | Han |
| 7,520,210 | B2 | 4/2009 | Theodore, Jr. |
| 7,575,422 | B2 | 8/2009 | Bode |
| 7,578,863 | B2 | 8/2009 | Becker |
| 7,591,882 | B2 | 9/2009 | Harazim |
| 7,594,941 | B2 | 9/2009 | Zheng |
| 7,594,942 | B2 | 9/2009 | Polderman |
| 7,610,955 | B2 | 11/2009 | Irwin |
| 7,628,836 | B2 | 12/2009 | Baronet |
| 7,637,699 | B2 | 12/2009 | Albrecht |
| 7,674,377 | B2 | 3/2010 | Carew |
| 7,677,308 | B2 | 3/2010 | Kolle |
| 7,708,537 | B2 | 5/2010 | Bhatia |
| 7,708,808 | B1 | 5/2010 | Heumann |

(56) References Cited

U.S. PATENT DOCUMENTS

| | | |
|---|---|---|
| 7,744,663 B2 | 6/2010 | Wallace |
| 7,748,079 B2 | 7/2010 | McDowell |
| 7,766,989 B2 | 8/2010 | Lane |
| 7,811,344 B1 | 10/2010 | Duke |
| 7,811,347 B2 | 10/2010 | Carlsson |
| 7,815,415 B2 | 10/2010 | Kanezawa |
| 7,824,458 B2 | 11/2010 | Borgstrom |
| 7,824,459 B2 | 11/2010 | Borgstrom |
| 7,846,228 B1 | 12/2010 | Saaaki |
| 7,938,874 B2 | 5/2011 | Auber |
| 2001/0007283 A1 | 7/2001 | Johal et al. |
| 2002/0009361 A1 | 1/2002 | Reichert |
| 2003/0029318 A1 | 2/2003 | Firey |
| 2003/0035718 A1 | 2/2003 | Langston |
| 2003/0136094 A1 | 7/2003 | Illingworth |
| 2003/0192718 A1 | 10/2003 | Buckman |
| 2004/0007261 A1 | 1/2004 | Cornwell |
| 2004/0170505 A1 | 9/2004 | Lenderink |
| 2005/0173337 A1 | 8/2005 | Costinel |
| 2005/0241178 A1 | 11/2005 | Arbeiter |
| 2006/0065609 A1 | 3/2006 | Arthur |
| 2006/0090430 A1 | 5/2006 | Trautman |
| 2006/0096933 A1 | 5/2006 | Maier |
| 2006/0157251 A1 | 7/2006 | Stinessen |
| 2006/0157406 A1 | 7/2006 | Maier |
| 2006/0193728 A1 | 8/2006 | Lindsey |
| 2006/0222515 A1 | 10/2006 | Delmotte |
| 2006/0230933 A1 | 10/2006 | Harazim |
| 2006/0239831 A1 | 10/2006 | Garris, Jr. |
| 2006/0254659 A1 | 11/2006 | Bellott |
| 2006/0275160 A1 | 12/2006 | Leu |
| 2007/0029091 A1 | 2/2007 | Stinessen |
| 2007/0036646 A1 | 2/2007 | Nguyen |
| 2007/0051245 A1 | 3/2007 | Yun |
| 2007/0062374 A1 | 3/2007 | Kolle |
| 2007/0065317 A1 | 3/2007 | Stock |
| 2007/0084340 A1 | 4/2007 | Dou |
| 2007/0140815 A1 | 6/2007 | Shinozaki |
| 2007/0140870 A1 | 6/2007 | Fukanuma |
| 2007/0151922 A1 | 7/2007 | Mian |
| 2007/0163215 A1 | 7/2007 | Lagerstadt |
| 2007/0172363 A1 | 7/2007 | Laboube |
| 2007/0196215 A1 | 8/2007 | Frosini |
| 2007/0227969 A1 | 10/2007 | Dehaene |
| 2007/0256398 A1 | 11/2007 | Barone et al. |
| 2007/0294986 A1 | 12/2007 | Beetz |
| 2008/0031732 A1 | 2/2008 | Peer |
| 2008/0039732 A9 | 2/2008 | Bowman |
| 2008/0179261 A1 | 7/2008 | Patrovsky |
| 2008/0246281 A1 | 10/2008 | Agrawal |
| 2008/0315812 A1 | 12/2008 | Balboul |
| 2009/0013658 A1 | 1/2009 | Borgstrom |
| 2009/0015012 A1 | 1/2009 | Metzler |
| 2009/0025562 A1 | 1/2009 | Hallgren |
| 2009/0025563 A1 | 1/2009 | Borgstrom |
| 2009/0151928 A1 | 6/2009 | Lawson |
| 2009/0169407 A1 | 7/2009 | Yun |
| 2009/0173095 A1 | 7/2009 | Bhatia |
| 2009/0266231 A1 | 10/2009 | Franzen |
| 2009/0304496 A1 | 12/2009 | Maier |
| 2009/0321343 A1 | 12/2009 | Maier |
| 2009/0324391 A1 | 12/2009 | Maier |
| 2010/0007133 A1 | 1/2010 | Maier |
| 2010/0021292 A1 | 1/2010 | Maier |
| 2010/0038309 A1 | 2/2010 | Maier |
| 2010/0043288 A1 | 2/2010 | Wallace |
| 2010/0043364 A1 | 2/2010 | Curien |
| 2010/0044966 A1 | 2/2010 | Majot |
| 2010/0072121 A1 | 3/2010 | Maier |
| 2010/0074768 A1 | 3/2010 | Maier |
| 2010/0083690 A1 | 4/2010 | Sato |
| 2010/0090087 A1 | 4/2010 | Maier |
| 2010/0139776 A1 | 6/2010 | Auber |
| 2010/0143172 A1 | 6/2010 | Sato |
| 2010/0163232 A1 | 7/2010 | Kolle |
| 2010/0183438 A1 | 7/2010 | Maier |
| 2010/0239419 A1 | 9/2010 | Maier |
| 2010/0239437 A1 | 9/2010 | Maier |
| 2010/0247299 A1 | 9/2010 | Maier |
| 2010/0257827 A1 | 10/2010 | Lane |
| 2011/0017307 A1 | 1/2011 | Kidd |
| 2011/0061536 A1 | 3/2011 | Maier |

FOREIGN PATENT DOCUMENTS

| | | |
|---|---|---|
| CA | 2647511 | 10/2007 |
| DE | 1024439 B | 2/1958 |
| EP | 0150599 | 8/1985 |
| EP | 301285 | 10/1991 |
| EP | 561065 | 11/1991 |
| EP | 552837 | 1/1993 |
| EP | 1582703 | 10/2005 |
| EP | 2013479 | 1/2009 |
| EP | 7838631.5 | 12/2009 |
| EP | 2233745 | 9/2010 |
| EP | 2322282 | 5/2011 |
| EP | 1796808 | 7/2011 |
| GB | 417373 | 10/1934 |
| GB | 1192354 | 5/1970 |
| GB | 1512381 | 6/1978 |
| GB | 2323639 | 9/1998 |
| GB | 2337561 | 11/1999 |
| GB | 2477699 | 8/2011 |
| JP | 54099206 | 1/1978 |
| JP | 80 68501 | 3/1996 |
| JP | 8-284961 A | 11/1996 |
| JP | 2002 242699 | 8/2002 |
| JP | 3711028 | 10/2005 |
| JP | 2005291202 | 10/2005 |
| KR | 2009085521 | 2/2008 |
| MX | 2008012579 | 12/2008 |
| WO | WO9524563 | 9/1995 |
| WO | WO9619276 | 6/1996 |
| WO | WO0074811 | 12/2000 |
| WO | WO0117096 | 3/2001 |
| WO | WO2005003512 | 1/2005 |
| WO | WO2006029413 | 3/2006 |
| WO | WO2006053088 | 5/2006 |
| WO | WO2007043889 | 4/2007 |
| WO | WO2007103248 | 9/2007 |
| WO | WO2007120506 | 10/2007 |
| WO | WO2008036221 | 3/2008 |
| WO | WO2008039446 | 3/2008 |
| WO | WO2008039491 | 4/2008 |
| WO | WO2008039731 | 4/2008 |
| WO | WO2008039732 | 4/2008 |
| WO | WO2008039733 | 4/2008 |
| WO | WO2008039734 | 4/2008 |
| WO | WO2008036394 | 7/2008 |
| WO | WO2009111616 | 9/2009 |
| WO | WO2009158252 | 12/2009 |
| WO | WO2009158253 | 12/2009 |
| WO | WO2010065303 | 6/2010 |
| WO | WO2010083416 | 7/2010 |
| WO | WO2010083427 | 7/2010 |
| WO | WO2010107579 | 9/2010 |
| WO | WO2010110992 | 9/2010 |
| WO | WO2011034764 | 3/2011 |
| WO | WO2011100158 | 8/2011 |
| WO | WO2012009158 | 1/2012 |
| WO | WO2012009159 | 1/2012 |
| WO | WO2012012143 | 1/2012 |
| WO | WO2012033632 | 3/2012 |

OTHER PUBLICATIONS

Tri-Phase Rotary Separator Turbine, Multiphase Power & Processing Technologies LLC Technical Literature (available at http://www/mpptech.com/techpp/pdfs/Tri-Phase.pdf).

IRIS™ In-Line Rotary Separator/Scrubber, Multiphase Power & Processing Technologies LLC Technical Literature (available at http://www.mpptech.com/products/IRIS_Rev5.2PDF).

Testing of an In-Line Rotary Separator (IRIS™) at the Chevron.

(56) References Cited

OTHER PUBLICATIONS

F. Ramirez Gas Production Facility by Hank Rawlins and Frank Ting, Presented at 52nd Annual Laurence Reid Gas Conditioning Conference, The University of Oklahoma, Feb. 24-27, 2002.
Utilization of Inline Rotary Separator as a Wet Gas Meter by V.C. Ting Presented at the 19th North Sea Flow Measurement Workshop 2001.
Analysis of Results of a Rotary Separator Rubine on the Shell Ram-Powell TLP by Greg Ross, Keith Oxley and Hank Rowlins.
Field Test Results of a Rotary Separator Turbine on the Ram/Powell TLP by C.H. Rawlins and G.D. Ross, presented at the 2001 Offshore Technology Conference in Houston, Texas Apr. 30-May 3, 2001.
Two-Phase Flow Turbines in Oil and Gas Production and Processing by Geirmund Vislie and Simon RH Davies.
Further Developments of the Biphase Rotary Separator Turbine by Geirmund Vislie, Simon Davies and Lance Hays.
"Technical Manual—High Pessure Air Compressor Model 13NL45", Navsea S6220-AT-MMA-010/93236, Oct. 28, 1991, pp. 3-23 to 3-32, Electric Boat Corporation, Groton, CT 06340.
EP05796401—Supplementary European Search Report mailed Aug. 26, 2008.
EP10196474—European Search Report mailed Mar. 21, 2011.
PCT/GB95/00193 Notification of International Search Report mailed Jun. 2, 1995.
PCT/FI00/00496—International Search Report mailed Oct. 16, 2000.
PCT/US2005/032556—Notification of International Preliminary Report on Patentability mailed Mar. 13, 2007.
PCT/US2005/032556—Notification of International Search Report and Written Opinion mailed Oct. 18, 2006.
PCT/US2005/040664—Notification of International Search Report and Written Opinion mailed Oct. 17, 2006.
PCT/NO2006/000341—International Search Report mailed Jan. 11, 2007.
PCT/US2007/008149—International Preliminary Report on Patentability dated Sep. 30, 2008.
PCT/US2007/008149—Written Opinion dated Jul. 17, 2008.
PCT/US2007/020101—International Preliminary Report on Patentability dated Apr. 2, 2009.
PCT/US2007/020101—International Search Report dated Apr. 29, 2008.
PCT/US2007/020471—International Preliminary Report on Patentability dated Apr. 2, 2009.
PCT/US2007/020471—International Search Report and Written Opinion dated Apr. 1, 2008.
PCT/US2007/020659—International Preliminary Report on Patentability dated Mar. 31, 2009.
PCT/US2007/020659—International Search Report and Written Opinion dated Sep. 17, 2008.
PCT/US2007/020768—International Preliminary Report on Patentability dated Apr. 9, 2009.
PCT/US2007/020768—International Search Report and Written Opinion dated Mar. 3, 2008.
PCT/US2007/079348—International Preliminary Report on Patentability dated Apr. 9, 2009.
PCT/US2007/079348—International Search Report dated Apr. 11, 2008.
PCT/US2007/079348—Written Opinion mailed Apr. 11, 2008.
PCT/US2007/079349—International Preliminary Report on Patentability dated Mar. 31, 2009.
PCT/US2007/079349—International Search Report and Written Opinion dated Apr. 2, 2008.
PCT/US2007/079350—International Preliminary Report on Patentability mailed Apr. 9, 2009.
PCT/US2007/079350—International Search Report mailed Apr. 2, 2008.
PCT/US2007/079350—Written Opinion mailed Apr. 2, 2008.
PCT/US2007/079352—International Preliminary Report on Patentability dated Apr. 9, 2009.
PCT/US2007/079352—International Search Report and Written Opinion dated Aug. 27, 2008.
PCT/US2009/036142—International Preliminary Report on Patentability dated Sep. 16, 2010.
PCT/US2009/036142—International Search Report mailed May 11, 2009.
PCT/US2009/036142—Written Opinion dated May 11, 2009.
PCT/US2009/047662—International Preliminary Report on Patentability dated Jan. 13, 2011.
PCT/US2009/047662—Written Opinion dated Aug. 20, 2009.
PCT/US2009/064916—Notification of International Preliminary Report on Patentability mailed Jun. 16, 2011.
PCT/US2009/064916—Notification of International Search Report and Written Opinion mailed Jan. 25, 2010.
PCT/US2010/021199—International Preliminary Report on Patentability dated Mar. 29, 2011.
PCT/US2010/021199—International Search Report and Written Opinion dated Mar. 22, 2010.
PCT/US2010/021218—International Report on Patentability dated Feb. 2, 2011.
PCT/US2010/021218—International Search Report and Written Opinion dated Mar. 23, 2010.
PCT/US2010/025650—International Report on Patentability dated Mar. 14, 2011.
PCT/US2010/025650—International Search Report and Written Opinion dated Apr. 22, 2010.
PCT/US2010/025952—International Report on Patentability dated Mar. 14, 2011.
PCT/US2010/025952—International Search Report and Written Opinion dated Apr. 12, 2010.
PCT/US2011/023593—Notification of International Search Report and Written Opinion dated Oct. 18, 2011.
PCT/US2011/037112—Notification of International Search Report and Written Opinion mailed Jan. 13, 2012.
PCT/US2011/042205—Notification of International Search Report and Written Opinion mailed Feb. 21, 2012.
PCT/US2011/042209—International Search Report mailed Feb. 24, 2012.
PCT/US2011/042227—Notification of International Search Report dated Feb. 21, 2012.
PCMS2011/048652—Notification of International Search Report and Written Opinion mailed Jan. 9, 2012.
"Natural Gas Liquids Recovery From Gas Turbine Fuel" in GE Oil & Gas *a product of ecomagination*; by Simone Amidei, Francesca Monti, Riccardo Valorosi, 2001, 6 pages.

COMBINATION OF EXPANSION AND COOLING TO ENHANCE SEPARATION

CROSS-REFERENCE TO RELATED APPLICATIONS

The present application is a national stage application of PCT Pat. App. No. PCT/US2011/037112, filed May 19, 2011, which claims priority to U.S. Provisional Patent Application Ser. No. 61/366,026, filed on Jul. 20, 2010, the contents of both are hereby incorporated by reference into the present disclosure in their entirety.

BACKGROUND

The present disclosure relates to fluid machinery, and more specifically to devices for separating higher-density components from lower-density components in fluids.

Separators are used to separate higher-density components from lower-density components in flow streams, such as from a natural gas flow stream. Close to a wellhead, however, where the flow stream is typically subjected to high pressures and temperatures, the higher and lower-density components in the flow stream can exhibit considerably similar substance characteristics. For instance, liquid molecules and gas molecules subjected to elevated pressures and temperatures are often indistinguishable and, consequently, difficult to separate in a typical separator.

There is a continuing need, therefore, for an apparatus or method for separating higher-density components from lower-density components in a high-pressure flow stream.

SUMMARY

Embodiments of the disclosure may provide a fluid separation apparatus. The apparatus may include an expander coupled to a main shaft and configured to receive and expand a working fluid feed stream, wherein the expander provides rotational energy to the main shaft and generates an expander outlet feed stream having a lower pressure than the working fluid feed stream. The apparatus may further include a rotary separator coupled to and driven by the main shaft, the rotary separator being configured to receive the expander outlet feed stream and separate a higher-density component in the expander outlet feed stream from a lower-density component thereof, thereby generating a separated lower-density feed stream and a separated higher-density stream. The apparatus may further include a compressor coupled to and driven by the main shaft, the compressor being configured to receive the separated lower-density feed stream from the separator and increase a pressure of the separated lower-density feed stream to generate a compressed lower-density stream.

Embodiments of the disclosure may further provide a method for removing higher-density components from lower-density components in a working fluid feed stream. The method may include expanding the working fluid feed stream in an expander coupled to a shaft to produce rotational energy and an expander outlet feed stream, wherein the rotational energy is transferred to the shaft, and driving a separator using the rotational energy generated by the expander to separate higher-density components from lower-density components contained in the expander outlet feed stream. The method may further include discharging a separated lower-density feed stream from the separator into a compressor, driving the compressor using the rotational energy generated by the expander, and compressing the separated lower-density feed stream to generate a compressed lower-density stream.

Embodiments of the disclosure may further provide a fluid separation apparatus. The apparatus may include an expander coupled to a main shaft and configured to receive and expand a working fluid feed stream, wherein the expander provides rotational energy from the working fluid feed stream to the main shaft and generates an expander outlet feed stream having a lower pressure than the working fluid feed stream. The apparatus may also include a rotary separator coupled to and driven by the main shaft, the rotary separator being configured to receive the expander outlet feed stream and separate a higher-density component in the expander outlet feed stream from a lower-density component thereof, thereby generating a separated lower-density feed stream and a separated higher-density stream, and a static separator disposed about the rotary separator. The apparatus may further include a multi-stage centrifugal compressor coupled to and driven by the main shaft, the compressor being configured to receive the separated lower-density feed stream from the separator and increase a pressure of the separated lower-density feed stream to generate a compressed lower-density stream. An auxiliary motor may be coupled to the main shaft and be configured to provide supplemental rotational energy to the main shaft to overcome any power shortages.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
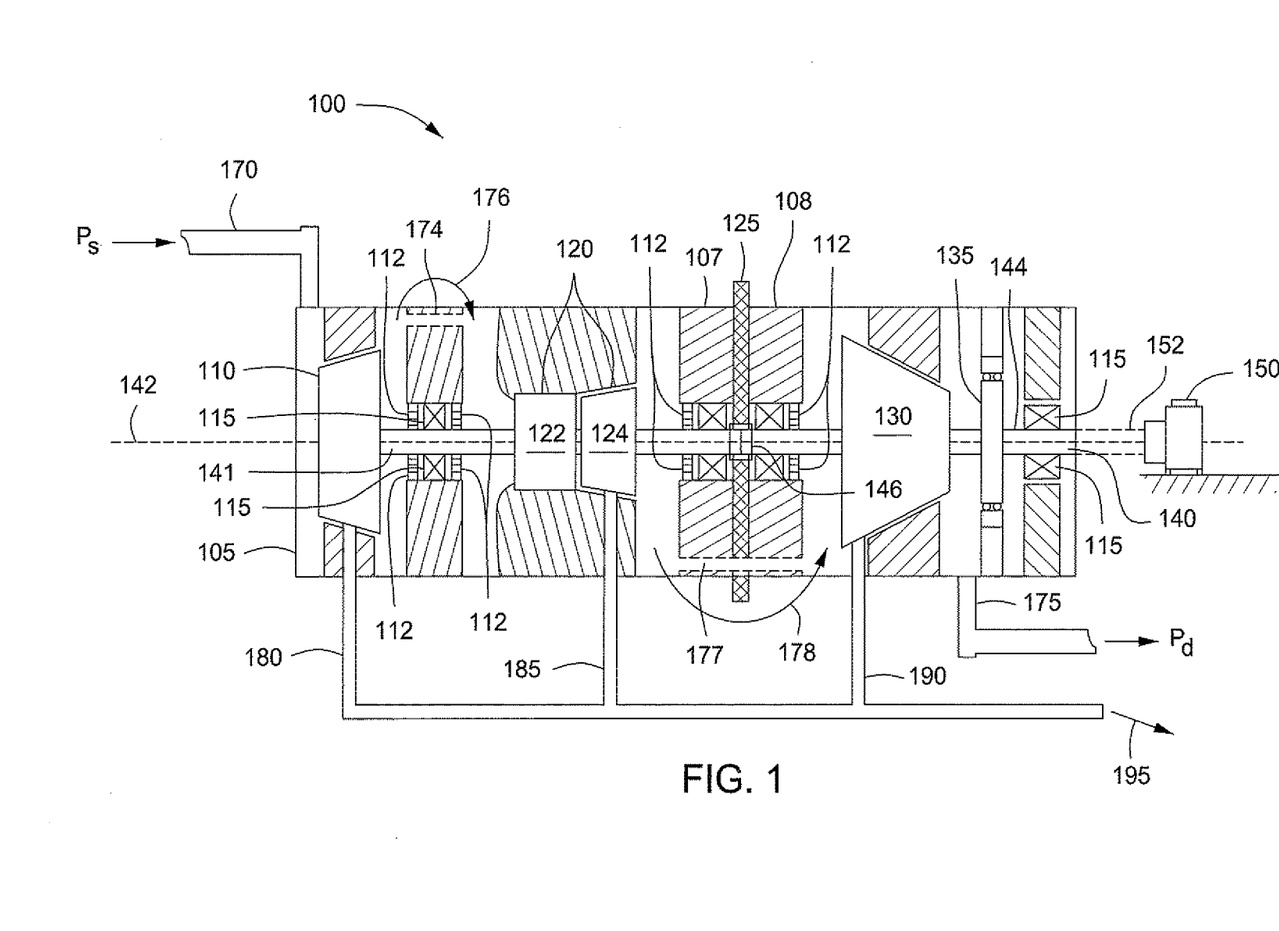
FIG. 1 illustrates a schematic side view of an exemplary fluid separation apparatus, according to one or more embodiments described.

FIG. 1 illustrates a schematic side view of an exemplary fluid separation apparatus 100, according to one or more embodiments described. In one or more exemplary embodiments, the fluid separation apparatus 100 may include an expander 110, a separator 120, a compressor 130, a balance piston 135, a main shaft 140, one or more bearings 115, and one or more seals 112, each of which may be disposed in a casing or housing 105. The expander 110, separator 120, and compressor 130 may each be coupled or otherwise attached to the main shaft 140 for rotation therewith. As will be described in greater detail below, the system 100 may be generally configured to receive and expand a high-pressure working fluid in the expander 110 to not only significantly reduce the pressure of the working fluid and thereby facilitate a more-efficient separation process in the succeeding separator 120, but also to drive the main shaft 140 and all system 100 components attached thereto (i.e., the separator 120 and the compressor 130).

One or more inlets 170 are in fluid communication with an inlet of the expander 110. One or more outlets 175 are in fluid communication with an outlet of the compressor 130. In one or more exemplary embodiments, a fluid communication path may be defined within the fluid separation apparatus 100 via the inlet 170, through the expander 110, from an expander outlet to a separator inlet via a fluid path 176, through the separator 120, from a separator outlet to a compressor inlet via a fluid path 178, through the compressor 130, and to the outlet 175.

In one or more exemplary embodiments, the main shaft 140 extends along at least a portion of a longitudinal length of the housing 105. In at least one embodiment, the main shaft 140 may include two or more shaft portions, such as a first shaft portion 141 and a second shaft portion 144. In other embodiments, however, the main shaft 140 may include a solitary structure where the first and second shaft portions 141, 144 form an unbroken, continuous shaft 140. As illustrated, the first and second shaft portions 141, 144 may be joined together or otherwise coupled via a coupling 146. The coupling 146 may be a rigid or flexible coupling, a zero-hysteresis coupling, a self-centering coupling, or any other shaft coupling apparatus, system, or arrangement known in the art. In operation, the first shaft portion 141 may be adapted to transfer rotational energy to the second shaft portion 144 via the coupling 146. However, there may be embodiments where the second shaft portion 144 may be required or configured to transfer rotational energy to the first shaft portion 141, as will be described below.

In one or more embodiments, the main shaft 140 may be rotationally-supported within the housing 105 by the one or more bearings 115 or bearing systems, such as radial and/or axial bearings, and may rotate about a longitudinal axis 142. In at least one embodiment, the bearings 115 may be part of a magnetic bearing system having active and/or passive magnetic bearings adapted to support the main shaft 140. A balance piston 135 may also be disposed along the main shaft 140 and be configured to counteract any axial thrust forces, such as those generated by the compressor 130.

In one or more exemplary embodiments, the housing 105 may be a single-piece housing having the expander 110, separator 120, compressor 130, and other components discussed above disposed therein. In other embodiments, however, the housing 105 may include a first housing section 107 and a second housing section 108 assembled or otherwise joined along a flange 125. The two housing sections 107, 108 may be assembled using bolts, welds, threaded assemblies, or other known joining techniques. The housing 105 may alternatively be replaced by a plurality of casings or housings (not shown), each in fluid communication with the other and into which at least the expander 110, the separator 120, and the compressor 130 may be disposed individually or in any combination.

In one or more embodiments, the fluid paths 174, 177 may be defined within the housing 105. For example, the fluid paths 174, 177 may be defined by one or more conduits, pipes, channels, and/or tubing arranged to bypass the seals 112 such that a pressurized working fluid may travel from the expander 110 to the separator 120 and/or from the separator 120 to the compressor 130. In other embodiments, however, the expander 110 may be disposed inboard of the seals 112 and bearings 115 (not shown) such that the expander 110 is axially-offset from the separator 120 without seals 112 and/or bearings 115 disposed therebetween. Consequently, fluids that pass through the expander 110 may be directed immediately to the separator 120 without having to be channeled through the fluid path 174.

The system 100 may further include an expander discharge outlet 180, a separator discharge outlet 185, and a compressor discharge outlet 190 in fluid communication with the expander 110, the separator 120, and the compressor 130, respectively. In at least one embodiment, the discharge outlets 180, 185, 190 may be fluidly coupled and configured to remove any separated or otherwise collected higher-density components from the expander 110, the separator 120, and the compressor 130, respectively. Any higher-density components, such as liquids, solids, or heavy gases, discharged into the discharge outlets 180, 185, and 190 may be combined into a collective discharge outlet 195 for removal from the system 100.

In one or more exemplary embodiments, the expander 110 may be an expansion turbine or turbo-expander. The expander 110 may be an axial flow turbine through which a working fluid feed stream, such as a natural gas feed stream, may be expanded to generate an expander outlet feed stream. As the working fluid feed stream expands, it provides rotational energy to the main shaft 140 by converting a portion of the energy resident in the working fluid feed stream into rotational energy. In at least one embodiment, the process of expanding the working fluid feed stream may cause the separation of at least a portion of higher-density components from lower-density components contained in the incoming working fluid feed stream. The separated higher-density components may be directed through the expander discharge outlet 180 for removal, collection, downstream use, and/or processing via the collective discharge outlet 195.

In one or more exemplary embodiments, at least a portion of the rotational energy derived from the expander 110 and transferred to the main shaft 140 may be used to power or otherwise rotate the separator 120. In at least one embodiment, the separator 120 may include a combination rotary separator 124 and static separator 122. The static separator 122 may be a screen, sharp turn flow passage, or other filter material and/or static configuration, known in the art, through which a fluid may pass. In at least one embodiment, the static separator 122 may be disposed upstream and adjacent the rotary separator 124, as depicted in FIG. 1. In other embodiments, however, the static separator 122 may be disposed downstream from the rotary separator 124. In yet other embodiments, the static separator 122 may be disposed around the rotary separator 124 in a nested relationship, without departing from the scope of the disclosure.

In one or more exemplary embodiments, the rotary separator 124 may include a rotating drum with an inlet end and an outlet end through which the working fluid passes. In other embodiments, the rotary separator 124 may include a rotatable tubular body having a central bore with an inlet end and an outlet end through which the working fluid passes. In yet other embodiments, the rotary separator 124 may be any rotary separator known in the art.

In operation, the separator 120, or the combination of the static separator 122 and the rotary separator 124, may be configured to receive the expander outlet feed stream via the fluid path 176 and separate higher-density components contained therein from lower-density components. The resulting separated fluid streams may be characterized as a separated lower-density feed stream and a separated higher-density stream. The separator 120 may be configured to direct the separated higher-density stream through the separator discharge outlet 185 for removal, collection, downstream use, and/or processing via the collective discharge outlet 195.

A portion of the rotational energy derived from the expander 110 and transferred to the main shaft 140 may also be used to power or otherwise rotate the compressor 130. The compressor 130 may be any compressor capable of increasing the pressure of a fluid. In at least one exemplary embodiment, the compressor 130 is a multi-stage centrifugal compressor. In operation, the compressor 130 may be configured to receive and compress the separated lower-density feed stream derived from the separator 120, thereby generating a compressed lower-density stream that can be discharged from the system 100 via line 175. In at least one embodiment, a portion of separable higher-density components may still be contained in the lower-density feed stream. Accordingly, the compressor 130 may be configured to collect and separate the separable higher-density components from the separated lower-density feed stream and direct the separable higher-density components through the discharge outlet 190 for removal, collection, downstream use, and/or processing via the collective discharge outlet 195.

In one or more embodiments, the main shaft 140 may extend beyond the interior of the housing 105 and thereby provide a shaft extension 152. In at least one embodiment, the shaft extension 152 may simply be an extension of the main shaft 140, or it may be a separate shaft coupled or otherwise attached to the main shaft 140 at its end. As illustrated, an auxiliary motor 150 may be coupled to the shaft extension 152. In other embodiments, however, the auxiliary motor 150 may be disposed within the housing 105 and may be coupled to the main shaft 140 without departing from the scope of the disclosure. The auxiliary motor 150 may be an electric motor, but may also be any type of driver known in the art, such as a gas turbine or a hydrodrive.

During start-up of the system 100 and/or during operation when the expander 110 may be unable to supply all the required power to efficiently operate the separator 120 and/or compressor 130, the auxiliary motor 150 may be used to supplement the power shortage. For instance, the motor 150 may be sized such that during normal operation of the system 100, the motor 150 supplies any power short-fall from the expander 110, thereby allowing the separator 120 and compressor 130 to continuously work at full speed and/or optimal efficiency.

In exemplary operation of the system 100, a working fluid feed stream of pressure $P_s$ is directed to the expander 110 via inlet 170 and expanded therein. In one or more exemplary embodiments, the working fluid feed stream may include any fluid having a higher-density component and a lower-density component, for example, a multi-phase fluid such as a liquid-gas mixture. The working fluid feed stream may include fluids, such as $CO_2$, air, water, or others without departing from the scope of the disclosure. In at least one embodiment, the working fluid feed stream may be a natural gas stream derived from a hydrocarbon well. As used herein, the term "natural gas" refers to a multi-component gas obtained from a crude oil well (associated gas) or from a subterranean gas-bearing formation (non-associated gas). The composition and pressure of natural gas may vary significantly. A typical natural gas stream contains methane ($CH_4$) as a major component, i.e. greater than 50 mol % of the natural gas stream is methane. The natural gas stream may also contain ethane, propane, butane, pentane, higher molecular weight hydrocarbons (e.g., $C_3$-$C_{20}$ hydrocarbons), one or more acid gases (e.g., hydrogen sulfide, carbon dioxide), or any combination thereof. The natural gas may also contain minor amounts of water, nitrogen, iron sulfide, wax, crude oil, or any combination thereof.

In one or more embodiments, the inlet pressure $P_s$ in the inlet 170 may be equal to or greater than about 3,000 psi. At the inlet pressure $P_s$, fluids and gases may be indistinguishable and difficult to separate. By expanding the working fluid feed stream in the expander 110, the inlet fluid pressure $P_s$ may be reduced, for example, to about 1,500 psi or lower, thereby allowing for easier separation of the higher-density components from the lower-density components in the succeeding separator 120. Furthermore, as the working fluid feed stream expands it provides rotational energy adapted to rotate the main shaft 140 and provide power to or otherwise drive both the separator 120 and the compressor 130.

As may be appreciated, removing higher-density components from the working fluid feed stream may allow the compressor 130 to re-compress the separated lower-density feed stream. In an embodiment, the compressor 130 is able to re-compress the separated lower-density feed stream back to or considerably close to the inlet pressure $P_s$ using only the energy derived from the expander 110. However, in embodiments where expansion of the working fluid feed stream fails to provide sufficient rotational energy to the separator 120 and/or the compressor 130, the auxiliary motor 150 may be employed and adapted to make up any power shortfall.

In one or more embodiments, the expander outlet feed stream is discharged from the expander 110 via fluid path 176 and directed to the succeeding separator 120. The expander outlet feed stream may be introduced to an inlet of the rotary separator 124 and/or the static separator 122. In one or more embodiments, the expander outlet feed stream passes through the rotary separator 124 and/or the static separator 122 such that the higher-density components (e.g., solids and/or liquids, or higher-density gases) are separated from the lower-density components (e.g., the separated lower-density feed stream). The separated lower-density feed stream may be directed to the compressor 130 via fluid path 178.

In one or more embodiments, the compressor 130 may be configured to raise the pressure of the separated lower-density feed stream from at or below about 1,500 psi to at or above about 3,000 psi. The compressed lower-density stream may be directed through the outlet 175 at a discharge pressure $P_d$. Accordingly, the discharge pressure $P_d$ may be about equal to or above the inlet pressure $P_s$. In one or more embodiments, the discharge pressure $P_d$ of the compressed lower-density stream may be adjusted to meet pipeline or other conduit requirements as appropriate. As described above, the auxiliary motor 150 may provide supplemental rotational energy to the compressor 130 in order to increase the pressure of the dry gas to be about equal to or above the inlet pressure $P_s$.

Figure 2:
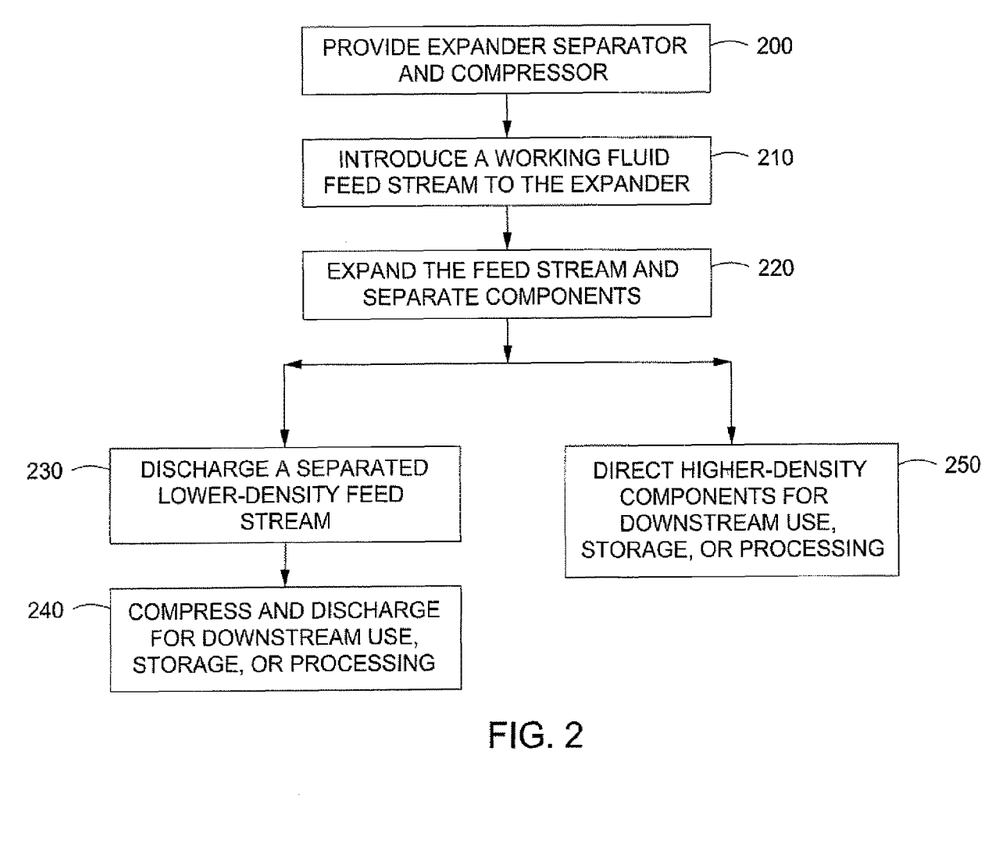
FIG. 2 illustrates a representative process flow of a method for separating higher-density components from lower-density components from a working fluid, according to one or more embodiments described.

FIG. 2 illustrates a representative process flow of a method for separating higher-density components from lower-density components from a working fluid, according to one or more embodiments described. In one or more exemplary embodiments, an expander, a separator, and a compressor may be provided, as at 200. A fluid communication path may be defined from the expander, through the separator, and to the compressor and a main shaft may be coupled to the expander, the separator, and the compressor. The main shaft may provide an operational energy source for at least the separator and/or the compressor.

During operation, a working fluid feed stream may be introduced to the expander, as at 210. The working fluid feed stream is expanded to generate an expander outlet feed stream and to generate rotational energy that can be transferred to the separator and the compressor through the shaft. The expander outlet feed stream may be directed to the separator where higher-density components, for example liquids, are separated from the lower-density components, such as gases, as at 220. In one embodiment, the separated lower-density feed stream is discharged from the separator and may be directed to the compressor, as at 230. The separated lower-density feed stream may be compressed, to produce a compressed lower-density stream, and discharged from the compressor for downstream use, storage, and/or processing, as at 240.

In one or more exemplary embodiments, any higher-density components separated from the expander outlet feed stream may be discharged for downstream use, storage, and/or processing, as at 250.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A fluid separation apparatus, comprising:
   an expander coupled to a main shaft and configured to receive and expand a working fluid feed stream, the expander being adapted to provide rotational energy to the main shaft and generate an expander outlet feed stream having a lower pressure than the working fluid feed stream;
   a rotary separator coupled to and driven by the main shaft, the rotary separator being configured to receive the expander outlet feed stream and separate higher-density components from lower-density components in the expander outlet feed stream, thereby generating a separated lower-density feed stream and a separated higher-density stream; and
   a compressor coupled to and driven by the main shaft, the compressor being configured to receive the separated lower-density feed stream from the rotary separator and increase a pressure of the separated lower-density feed stream to generate a compressed lower-density stream.

2. The fluid separation apparatus of claim 1, wherein the expander is an axial flow turbine.

3. The fluid separation apparatus of claim 1, wherein the compressor is a multi-stage centrifugal compressor.

4. The fluid separation apparatus of claim 1, wherein the working fluid feed stream has an inlet pressure of about 3,000 psi and the expander is configured to lower the inlet pressure to less than or equal to about 1,500 psi.

5. The fluid separation apparatus of claim 4, wherein the separated lower-density feed stream has a pressure of about 1,500 psi or less and the compressor is configured to raise the pressure to greater than 3,000 psi.

6. The fluid separation apparatus of claim 1, wherein the rotary separator is configured to direct the separated higher-density stream through a separator discharge outlet.

7. The fluid separation apparatus of claim 1, wherein the expander is configured to separate a higher-density working fluid component from a lower-density working fluid component in the working fluid feed stream and direct the higher-density working fluid component through an expander discharge outlet.

8. The fluid separation apparatus of claim 1, wherein the compressor is configured to separate a separable higher-density component from the lower-density feed stream and direct the separable higher-density component through a compressor discharge outlet.

9. The fluid separation apparatus of claim 1, further comprising a static separator disposed about the rotary separator.

10. The fluid separation apparatus of claim 1, further comprising an auxiliary motor coupled to the main shaft to provide supplemental rotational energy to the main shaft.

11. The fluid separation apparatus of claim 1, further comprising one or more magnetic bearings configured to rotationally support the main shaft.

12. A method for removing higher-density components from lower-density components in a working fluid feed stream, comprising:
   expanding the working fluid feed stream in an expander to generate an expander outlet feed stream, the expander being coupled to a shaft;
   generating rotational energy with the expander that is transferred to the shaft;
   driving a separator using the rotational energy to separate higher-density components from lower-density components present in the expander outlet feed stream;
   discharging a separated lower-density feed stream from the separator into a compressor;
   driving the compressor using the rotational energy; and
   compressing the separated lower-density feed stream to generate a compressed lower-density stream.

13. The method of claim 12, further comprising directing the higher-density components through a separator discharge outlet.

14. The method of claim 12 further comprising:
separating with the expander a higher-density working fluid component from a lower-density working fluid component in the working fluid feed stream; and
directing the higher-density working fluid component through an expander discharge outlet.

15. The method of claim 12 further comprising:
separating with the compressor a separable higher-density component from the separated lower-density feed stream; and
directing the separable higher-density component through a compressor discharge outlet.

16. The method of claim 12, further comprising supplying supplemental rotational energy to the shaft via an auxiliary motor.

17. The method of claim 12, further comprising lowering the pressure of the working fluid feed stream in the expander from about 3,000 psi to less than or equal to about 1,500 psi.

18. The method of claim 12, further comprising compressing the separated lower-density feed stream with the compressor to a pressure of about 3,000 psi or higher.

19. A fluid separation apparatus, comprising:
an expander coupled to a main shaft and configured to receive and expand a working fluid feed stream, the expander being adapted to provide rotational energy from the working fluid feed stream to the main shaft and generate an expander outlet feed stream having a lower pressure than the working fluid feed stream;
a rotary separator coupled to and driven by the main shaft, the rotary separator being configured to receive the expander outlet feed stream and separate a higher-density component from a lower-density component in the expander outlet feed stream, thereby generating a separated lower-density feed stream and a separated higher-density stream;
a static separator disposed about the rotary separator;
a multi-stage centrifugal compressor coupled to and driven by the main shaft, the compressor being configured to receive and compress the separated lower-density feed stream to generate a compressed lower-density stream; and
an auxiliary motor coupled to the main shaft and configured to provide supplemental rotational energy to the main shaft.

20. The apparatus of claim 19, further comprising:
a first housing having the expander, rotary separator, and static separator disposed therein; and
a second housing coupled to the first housing and having the multi-stage compressor disposed therein.

\* \* \* \* \*